Aug. 24, 1954

E. W. CARROLL 2,687,206

FRUIT ORIENTATION DEVICE

Filed Sept. 12, 1949

INVENTOR.
ELLSWORTH W. CARROLL
BY
Herbert E. Metcalf
ATTORNEY

Aug. 24, 1954
E. W. CARROLL
2,687,206
FRUIT ORIENTATION DEVICE
Filed Sept. 12, 1949
2 Sheets-Sheet 2
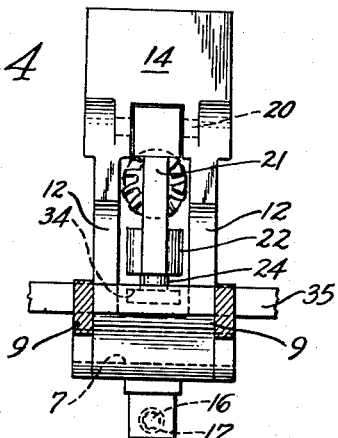
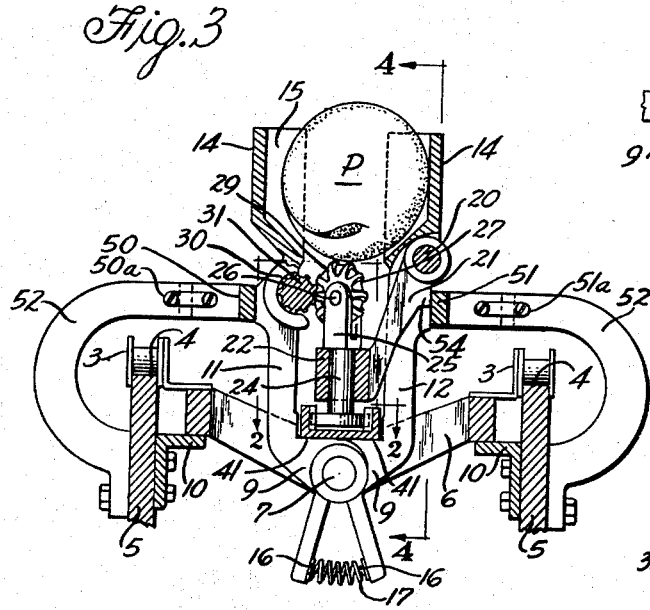
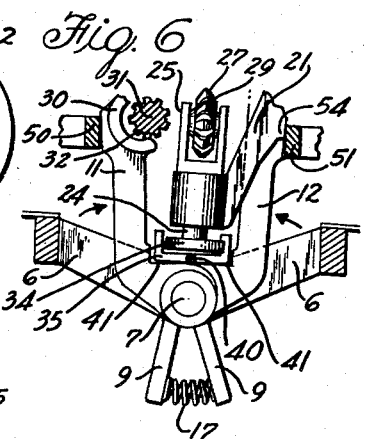
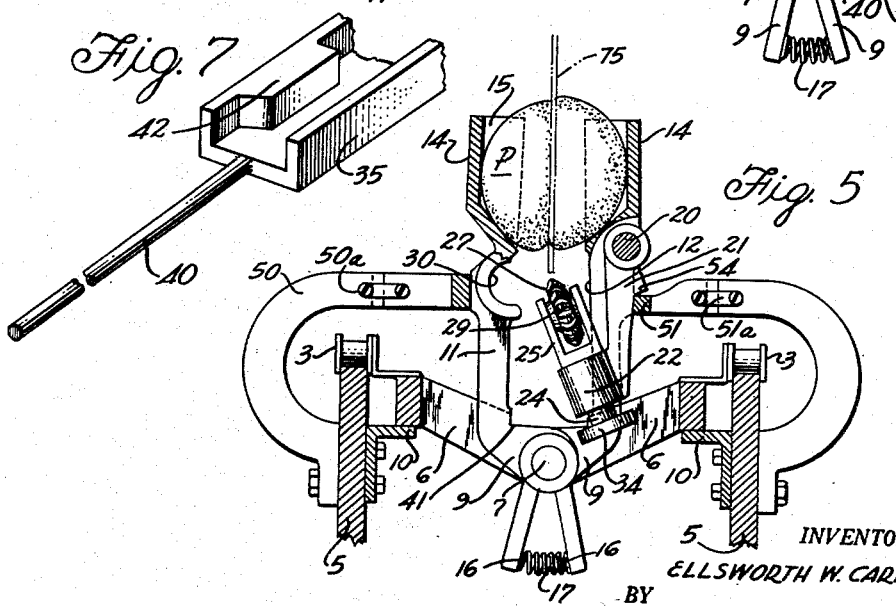
INVENTOR.
ELLSWORTH W. CARROLL
BY
Herbert E. Metcalf
ATTORNEY Patented Aug. 24, 1954

2,687,206

UNITED STATES PATENT OFFICE 2,687,206

FRUIT ORIENTATION DEVICE

Ellsworth W. Carroll, Redwood City, Calif., assignor to S & W Fine Foods, Inc., San Francisco, Calif., a corporation of California Application September 12, 1949, Serial No. 115,170

9 Claims. (Cl. 198—33)

The present invention relates to fruit orientators, and more particularly to a device whereby a fruit having a stem indent elongated in the plane of the seam or suture of the fruit may be orientated both as to stem indent and as to suture, preliminary to halving of the fruit, as by saw, for example.

The present invention is a modification of the device shown, described, and claimed in my prior filed application Serial No. 98,260, filed June 10, 1949, and now Patent No. 2,563,947, and is particularly useful in orientating peaches.

In the above identified application I disclosed and claimed apparatus adapted to orientate fruit such as peaches as to indent and seam in two stages. The first stage orientated the fruit as to indent and sometimes as to seam by rotating the fruit by the use of a wheel supporting a major portion of the weight of the fruit, the wheel being changed in its vertical plane of rotation during fruit rotation. As the deepest penetration of the wheel into the indent takes place when the wheel rotational plane registers with the indent and seam plane, some indent orientation took place on the rotating wheel. The fruit then passed to the second stage where substantially the entire weight of the fruit was supported on an indent shaped member while this member was being oscillated to various vertical planes so that the deepest penetration of the indent shaped member could take place. Thereafter, by withdrawing the indent shaped member in a predetermined position, all fruit properly orientated by the wheel and the indent shaped member would be left in a predetermined position in the machine, both as to indent and seam, so that further operation, such as inspection and halving could be performed on the fruit.

It is an object of the present invention to perform both indent and seam orientation in a single stage, and by the use of the same indent fitting member, i. e., the orientating wheel.

It is another object of the invention to provide a relatively simple means for orientating seamed fruit having an elongated stem indent both as to indent and seam location.

It is another object of the present invention to provide a simple mechanism for changing the attitude of an indented fruit while being rotated for indent orientation by an orientation member, such as a wheel.

Briefly, the present invention includes the use of fruit restraining means holding an indented seamed fruit such as a peach in a position where a major portion of its weight rests on an orientation member, such as a wheel, rotating in a vertical plane. While so resting, the wheel is rotated to rotate the fruit to scan the fruit for the indent. When the indent and wheel periphery register, the fruit ceases rotation, due to its weight. However, the registry of indent and wheel will not necessarily be complete so as to give registry of the wheel with the longest extent of the indent, so means are provided to stop the rotation of the wheel and then to move the wheel in various vertical planes to cause the fruit to settle on the wheel to the deepest extent, thereby causing the seam plane to coincide with the wheel plane. The wheel plane changes can be relatively slow and relatively fast, as well as of both high and low amplitudes, or a combination of such motions.

The present invention may be more fully understood by reference to the appended drawings, in which:

Figure 3 is a view partly in elevation and partly in section, taken as indicated by line 3—3 in Figure 1.

Figure 4 is a side elevational view taken as indicated by line 4—4 in Figure 3.

Figure 5 is a view partly in elevation and partly in section, taken as indicated by line 5—5 in Figure 1.

Figure 6 is a fragmentary view of the wheel and arm structure taken as the cup halves are closing just prior to the beginning of the cam track shown in Figure 2.

Figure 7 is a perspective view of the beginning of the cam track.

Figure 1:
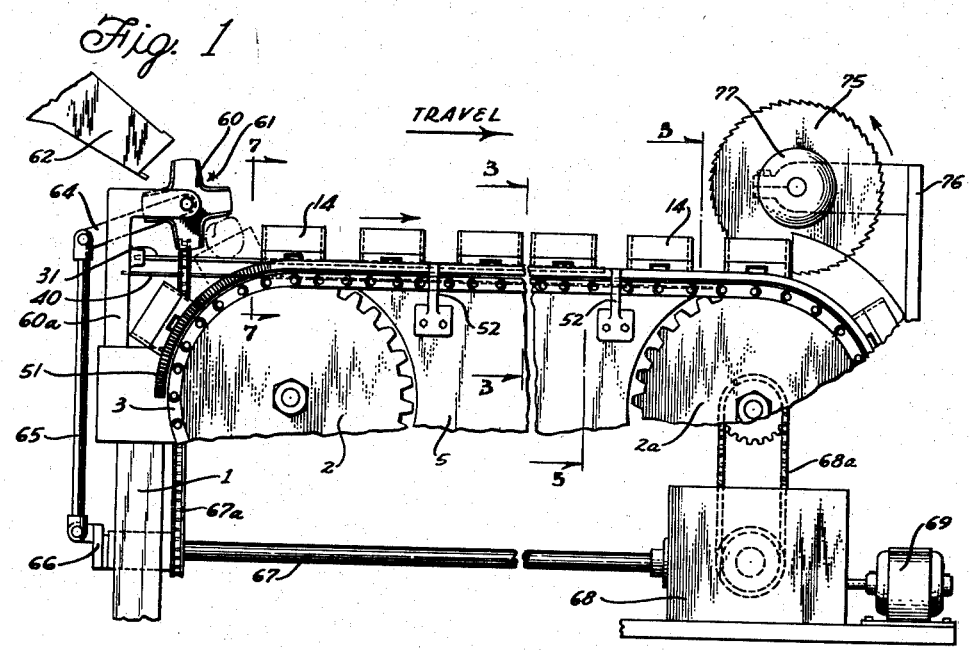
Figure 1 is a partial side elevation view of a carrier type machine embodying one preferred form of the present invention.

Referring first to Figure 1 for a general description of the machine, a frame 1 supports two spaced pairs of gears, a front pair 2 and a rear pair 2a, these gears rotating in vertical planes to carry therebetween a pair of endless carrier chains 3. Between each front and rear gear, the chains 3 are supported on the top horizontal edges 4 of two frame plates 5, best shown in section in Figures 3 and 5. Frame plates 5 are supported from frame 1 at each end thereof.

At regular intervals, the chains 3 are connected by cross bars 6, as shown in Figures 3 and 5, and each cross bar 6 carries a central horizontal pin 7. Each pin 7 has a pair of scissor arms 9 mounted thereon. The outer ends of cross bars 6 ride on brackets 10 attached to frame plates 5.

The ends of the upwardly extending portions 11 and 12 of the scissor arms 9 support opposed, curved cup halves 14 extending upwardly to define a fruit restraining recess 15 shown in Figures 3 and 5 as holding a peach P.

The lower portions of scissor arms 9 below pin 7 extend downwardly and outwardly to end in opposed spring retainers 16 over which is positioned a compression spring 17 tending to open or force apart the cup halves 14.

As seen in Figures 3, 4, and 5, the two upwardly extending arm portions 11 and 12 are not alike.

One arm portion 12 is provided with a wheel arm pivot 20 extending horizontally adjacent the bottom of the associated cup half 14 and a wheel arm 21 is mounted to swing freely in a vertical plane on the arm pivot 20.

Wheel arm 21 extends downwardly and inwardly to terminate in a vertical wheel stud bearing 22 below the center of recess 15.

A wheel stud 24 is mounted to rotate in the wheel stud bearing 22, this stud terminating above bearing 22 in a wheel fork 25 crossed by a horizontal wheel shaft 26. An orientation wheel 27 is mounted on shaft 26, this wheel having on both sides of its tapered periphery a set of bevel gear teeth 29.

The opposite arm portion 11 is cut away opposite wheel shaft 26 to form a half bearing 30 which, when the scissors arms 9 are closed, supports a pinion wire 31 having longitudinal teeth 32 thereon adapted to mesh with gear teeth 29 on one side of wheel 27. The exterior support and drive for the pinion wire 31 will be described later.

Figure 2:
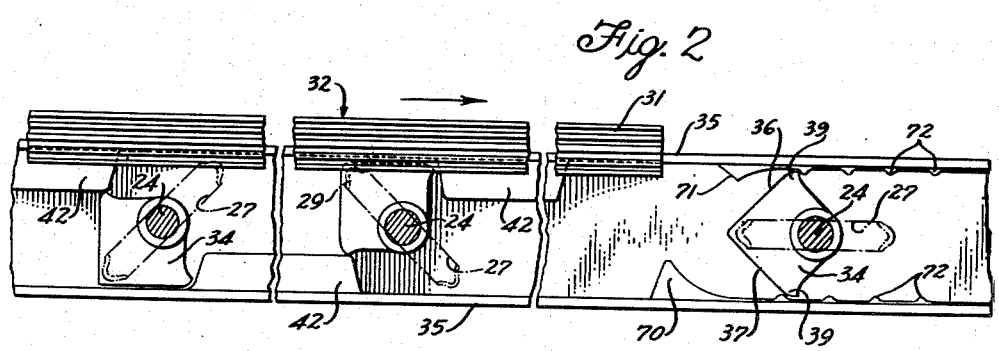
Figure 2 is a plan view of a wheel oscillating cam track utilized in the machine of Figure 1, taken as indicated by line 2—2 in Figure 3.

Below the wheel stud bearing 22, the wheel stud 24 terminates in a flat cam 34 horizontally positioned to operate in a cam track 35 as shown in contour in Figure 2. Cam 34 has two rear surfaces 36 and 37 joined centrally at 90°, these surfaces terminating laterally in rounded corners 39. Cam track 35 is supported from frame 1 at the front end only of the machine by rod 40, and by shoulders 41 on each scissors arm.

Cam track 35 is provided with cam blocks 42 alternately positioned on each side thereof to alternately engage rounded corners 39 of the cam 34 so that the cam is turned 90° at each cam block contact. This turning of the cam 34 turns wheel 27 so that the wheel 27 oscillates 90°. The lateral swing of wheel 27 is such that at two 45° positions away from the central vertical plane of the machine, the teeth 29 on the wheel engage the teeth 32 on the pinion wire 31. Thus as the cam 34 passes along cam track 35 the wheel 27 is flipped from one positively driven position to another positively driven position 90° away, remaining in each driven position for a time as determined by the length of each cam block 42, and the rate of the progression of the carrier.

Referring again to Figures 3, 5, and 6, in conjunction with the remaining figures, a pair of arm cams 50 and 51 is utilized to control the position of scissor arms 9, and one arm cam is supported from each side plate 5 as by cam brackets 52, so that there is an arm cam on each side of the fruit restraining assembly. The arm cams are adjustable laterally as by adjustments 50a and 51a.

Arm cams 50 and 51 begin as each set of opposed cup halves rises around front gears 2 to enter the horizontal portion of the carrier path. Prior to reaching the arm cams 50 and 51, the cup halves 14 are spread apart by the spring 17.

As the recesses rise, the arm cams are shaped to come closer together, thereby forcing the cup halves together by contact with upper portions 11 and 12 of scissor arms 9, to a position to hold fruit, graded for a particular machine run, loosely, so that the fruit can be freely revolved in the recess 15 formed by the opposed cup halves 14 by the rotating wheel 27. At the same time, one of the arm cams 51, the right hand arm cam in the drawings, is sufficiently high so that it also bears against a cam shoulder 54 on wheel arm 21, thereby holding this arm so as to position the wheel 27 centrally below the fruit recess 15 with the major portion of the weight of the fruit resting on the wheel. This position is shown in Figure 3 and is held by the fruit over the full length of cam track 35.

At the beginning of the horizontal portion of the carrier path, the fruit, such as peaches to be orientated, is loaded, preferably by utilizing the loader disclosed and claimed in my prior application cited above. Essentially this loader as shown in Figure 1 comprises a star wheel 60 mounted to rotate in a vertical plane on an upright 60a and having four fruit receiving recesses 61 thereon, each recess receiving a fruit from a fruit chute 62.

Star wheel 60 is rotated by a ratchet (not shown) operated by a ratchet arm 64 in turn operated by a vertical ratchet rod 65 driven from a crank 66 on the front end of a longitudinal shaft 67, this shaft being driven from a main gear box 68 in turn energized by main motor 69. The rotation of star wheel 60 is timed so that one peach is dropped into each recess 15 formed as the cup halves 14 reach the top of the front gears 2 to start progression along the horizontal path of the machine.

As the cup halves rise over the front gears 2, the arm cams 50 and 51 are so proportioned and curved as to permit the upper portions of the scissors arms to move past the sides of the pinion wire 31 and the cam 34 to move across the top of the round rod 40 extending forward from the cam track and fastened to the upright 60a of the frame 1, and then close to place the pinion wire 31 in the half bearing 30, and to center the cam 34 over rod 40 so that the cam 34 can enter the cam track 35 which begins as soon as the upper portions 11 and 12 of the scissors arms come together in a position to hold a fruit at the beginning of the horizontal path of the carrier. The position of the fruit restraining assembly just as the upper portions 11 and 12 of the scissors arms 9 come together is shown in Figure 6.

It is to be noted that the pinion wire 31 and the cam track 35 are supported from the frame at their forward ends only. For the remainder of their lengths they are supported by the moving fruit restraining assemblies. As several assemblies are on the horizontal path of the carrier at one time, and as one or more wheels 27 will be in contact with the pinion wire 31 at all times, there is no tendency for the pinion wire 31 to leave the half bearings 30, and excessive wear has not been found to take place in half bearings 30.

Rear gears 2a are driven to progress the carrier from gear box 68 by drive chain 68a and the pinion wire 31 is rotated from horizontal shaft 67 by pinion wire chain 67a.

After the fruit has been rotated in several vertical planes by the action of the shifting wheel in each receptacle, a large percentage of the fruit will be orientated as to indent, with the fruit indent registered with the wheel periphery. A certain percentage of the fruit will also have the elongation of the indent properly registered with the wheel.

At a certain point in the horizontal path of the carrier, the cam track 35 is provided with a cam turning block 70 (Figure 2) and with a following straightening block 71 on the opposite side of the cam track, slightly to the rear of the turning block 70. These latter two blocks turn the cam 35 in progressively shorter arcs so that the wheel 27 is parallel to the line of progression of the carrier and centrally positioned below the fruit recess 15.

The sides of the cam track 35 thereafter are provided with opposite and alternate corner contacting projections 72 which contact corners 39 of the cam 34 to rapidly oscillate the wheel in vertical planes over short arcs. This action tends to settle the fruit down on the wheel and to rotate the fruit so that the elongation of the seam registers correctly with the plane of the wheel, thus providing additional seam orientation. It is to be noted that after leaving the 90° blocks 42 the pinion wire 31 ends so that the wheel 27 is no longer driven by the pinion wire and is therefore, during this latter seam orientation, not rotating.

At the output end of the machine, a circular saw 75 is mounted on a saw bracket 76 erected from frame 1, this saw being driven by a saw motor 77 and being positioned in the central vertical plane of the machine so that peaches held in the recesses 15 will be bisected by the saw.

Just prior to reaching the saw the cam track 35 terminates. The arm cams 50 and 51 then cause the fruit to be firmly grasped by the half cups 14 and the wheels 27 moved out of the way of the saw. The former action is caused by positioning arm cams 50 and 51 closer to the central plane of the machine. The latter action is accomplished by discontinuing the top portion of the arm cam 51 bearing against wheel arm shoulder 54, thereby allowing the wheel to swing downwardly by gravity to a position below the saw 75. This position of the assembly is shown in Figure 5. Further progression of the fruit restraining assembly passes the clamped fruit through the saw. When the orientation process as described has been successful, the two halves of the fruit are substantially alike, with half of the indent in each fruit half, and with the saw cut through the seam of the fruit. In this manner a high percentage of top grade halves is assured.

After the fruit has been halved, it can be discharged for later removal of the pit halves, or the pit halves may be separated and taken to a pitting station as in the machine of the application cited above, but as this pitting station is no part of the present invention it will not be described herein.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is, therefore, claimed in any of its forms or modifications within the legitimate and valid scope of the appended claims.

I claim:

1. Means for orientating seamed indented fruit comprising a carrier, means for progressing said carrier over a horizontal path, a plurality of means forming fruit restraining recesses mounted on said carrier, each of said means being formed from two opposed parts, means for loading fruit into said recesses, an orientation wheel rotatable in vertical planes positioned in the bottom of each recess forming means and mounted to move with said recess forming means, said wheel being supported on one of said parts only, means for changing the plane of rotation of said wheel, means for rotating said wheel, and means for displacing said wheel out of the central vertical plane of said recess prior to said recess forming means reaching a predetermined point on said path.

2. Apparatus in accordance with claim 1 wherein said wheel displacement means is positioned to move said wheel independently of the part on which said wheel is supported.

3. Apparatus in accordance with claim 1 wherein said means to change the vertical plane of said wheel is shaped to change the plane of said wheel first over arcs up to 90° and thereafter in smaller arcs.

4. Means for orientating seamed indented fruit comprising an endless carrier, means for progressing said carrier over a path including a horizontal path, a plurality of means each forming a fruit restraining recess, said means being divided into halves along a central vertical plane parallel to the line of progression of said carrier, said halves being horizontally spaced apart, a movable wheel support cooperating with each recess forming means and mounted on one of said halves only, a pivot pin projecting upwardly from said wheel support, an orientation wheel mounted on said pivot pin, means for moving each support with relation to its cooperating recess to place said wheel with the plane of rotation thereof in a vertical plane at the bottom of the recess in a position between said halves to support at least a portion of the weight of a fruit in said recess, means for changing the vertical plane of rotation of said wheels during progression of said carrier, means for rotating said wheel over a portion of the path where said wheel plane changes are made, and means for moving said wheel support out of the space between said halves prior to reaching a predetermined position along the carrier path after said wheel plane changes have been made.

5. Apparatus in accordance with claim 4 wherein said means for changing the vertical plane of rotation of said wheel is a cam attached to said pivot pin and wherein a stationary cam track is positioned below a plurality of recess forming means, said cam track having projections thereon contacting said cam to turn said pivot pin.

6. Apparatus in accordance with claim 4 wherein said means for changing the vertical plane of rotation of said wheel is a cam attached to said pivot pin and wherein a stationary cam track is positioned below a plurality of recess forming means, said cam track having projections thereon contacting said cam to turn said pivot pin, said cam track terminating prior to said recesses reaching said predetermined position.

7. Apparatus in accordance with claim 4 wherein said wheel support is an arm extending downwardly from said recess forming means and pivotally attached to said one half, and wherein a stationary cam is positioned to contact and control the position of said arm.

8. Apparatus in accordance with claim 4 wherein said means for changing the plane of wheel rotation is positioned beneath said wheel, wherein said wheel displacing means is shaped to move said wheel downwardly, and wherein said means for changing the plane of wheel rotation is terminated prior to a wheel reaching said wheel contacting member to permit the downward movement of a wheel.

9. Means for orientating fruit comprising a plurality of pairs of fruit receptacle halves, means for moving said halves from an apart position into opposed relation to form fruit restraining recesses at the beginning of said horizontal path, means for serially progressing the opposed pairs over a vertical path followed by a horizontal path, a wheel cooperating with the bottom of each recess mounted on one of said halves only and rotatable in vertical planes to rotate a fruit in said recess, said wheel having peripheral gear teeth thereon, a pinion wire having longitudinal teeth thereon positioned to pass through a plurality of recesses at one side of said wheels and parallel to the line of progression of said recesses while on said path, said pinion wire being supported by a half bearing in one of the halves of each pair, means for changing the vertical plane of rotation of said wheels to bring the teeth thereof into and out of engagement with said pinion wire, means for supporting said pinion wire at one end only outside of said recesses at a point where said halves will close around said pinion wire, and means for rotating said pinion wire.

References Cited in the file of this patent
UNITED STATES PATENTS

| Number | Name | Date |
|---|---|---|
| 553,649 | Harpold | Jan. 28, 1896 |
| 2,076,942 | Gardner | Apr. 13, 1937 |
| 2,296,490 | Ashlock, Jr. | Sept. 22, 1942 |
| 2,334,416 | Kok | Nov. 16, 1943 |
| 2,387,709 | Ashlock, Jr. | Oct. 30, 1945 |
| 2,505,235 | Derbenwick et al. | Apr. 25, 1950 |